May 31, 1938.  J. A. WEBB  2,119,476
MACHINE FOR MAKING MULTI-PLY BELTING
Filed June 12, 1936  5 Sheets-Sheet 1
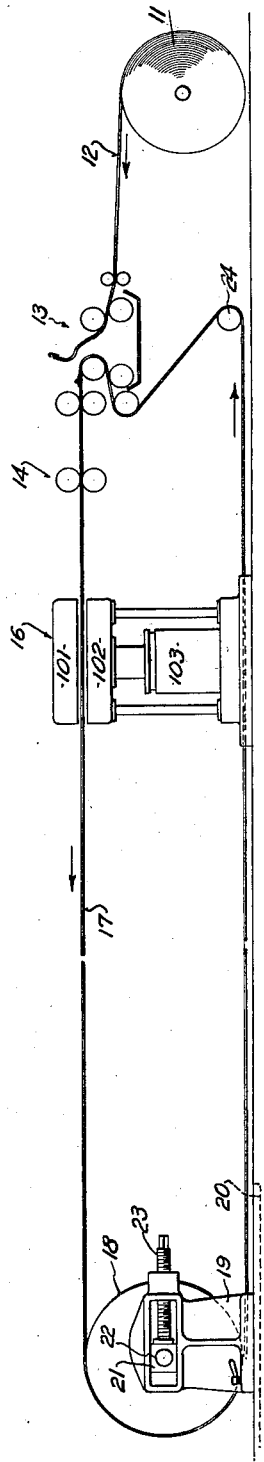
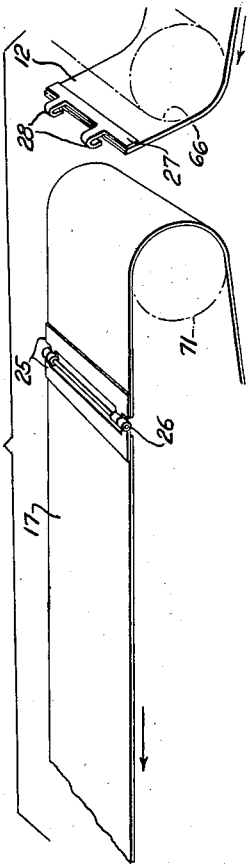
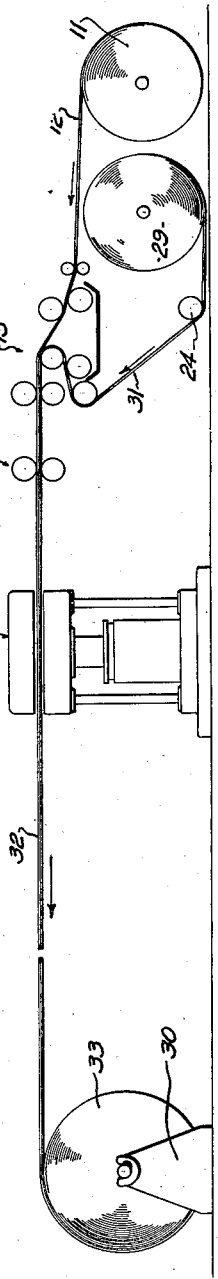
Inventor
James A. Webb
By Albert R. Henry
Attorney

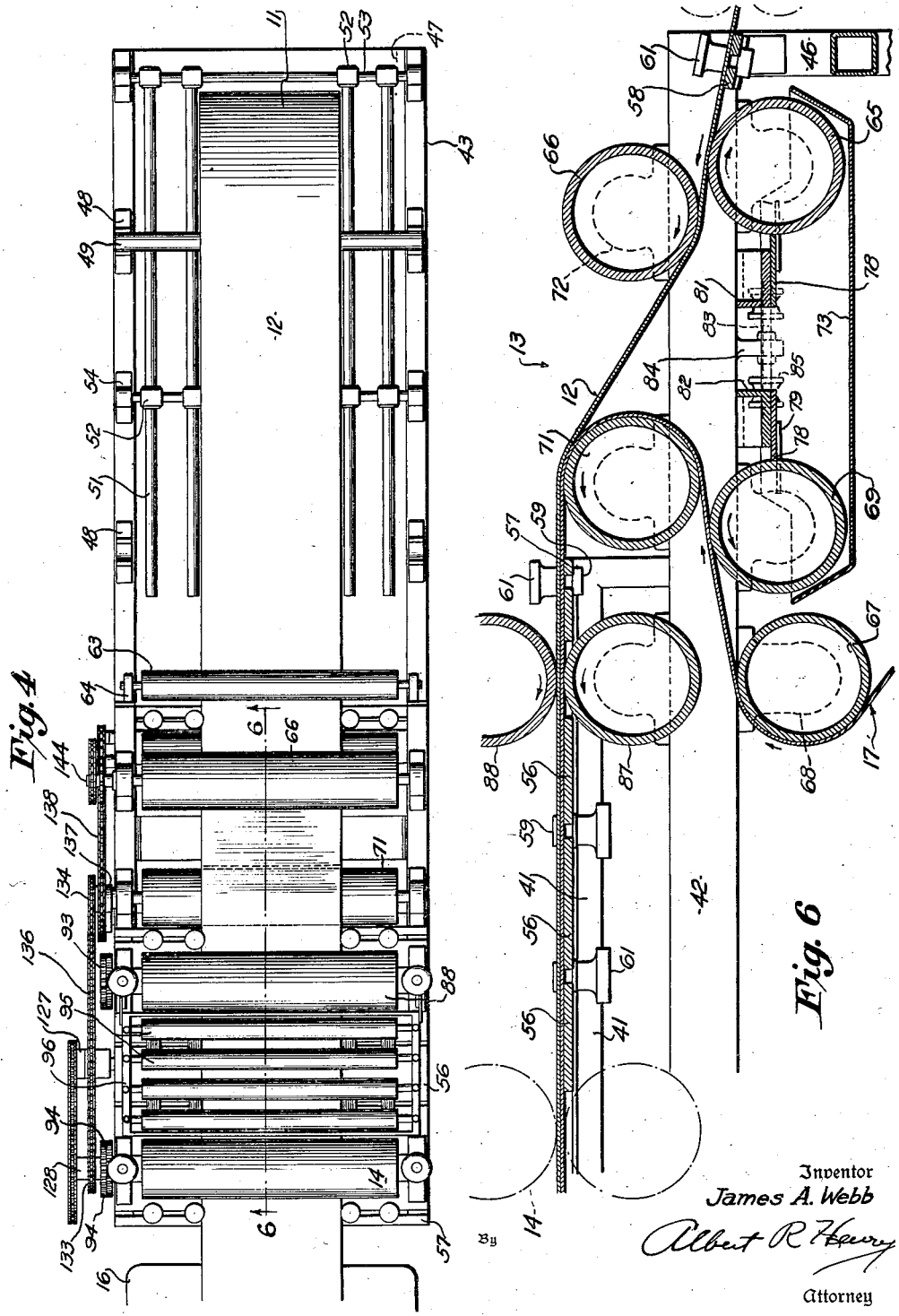

May 31, 1938.  J. A. WEBB  2,119,476
MACHINE FOR MAKING MULTI-PLY BELTING
Filed June 12, 1936  5 Sheets-Sheet 3
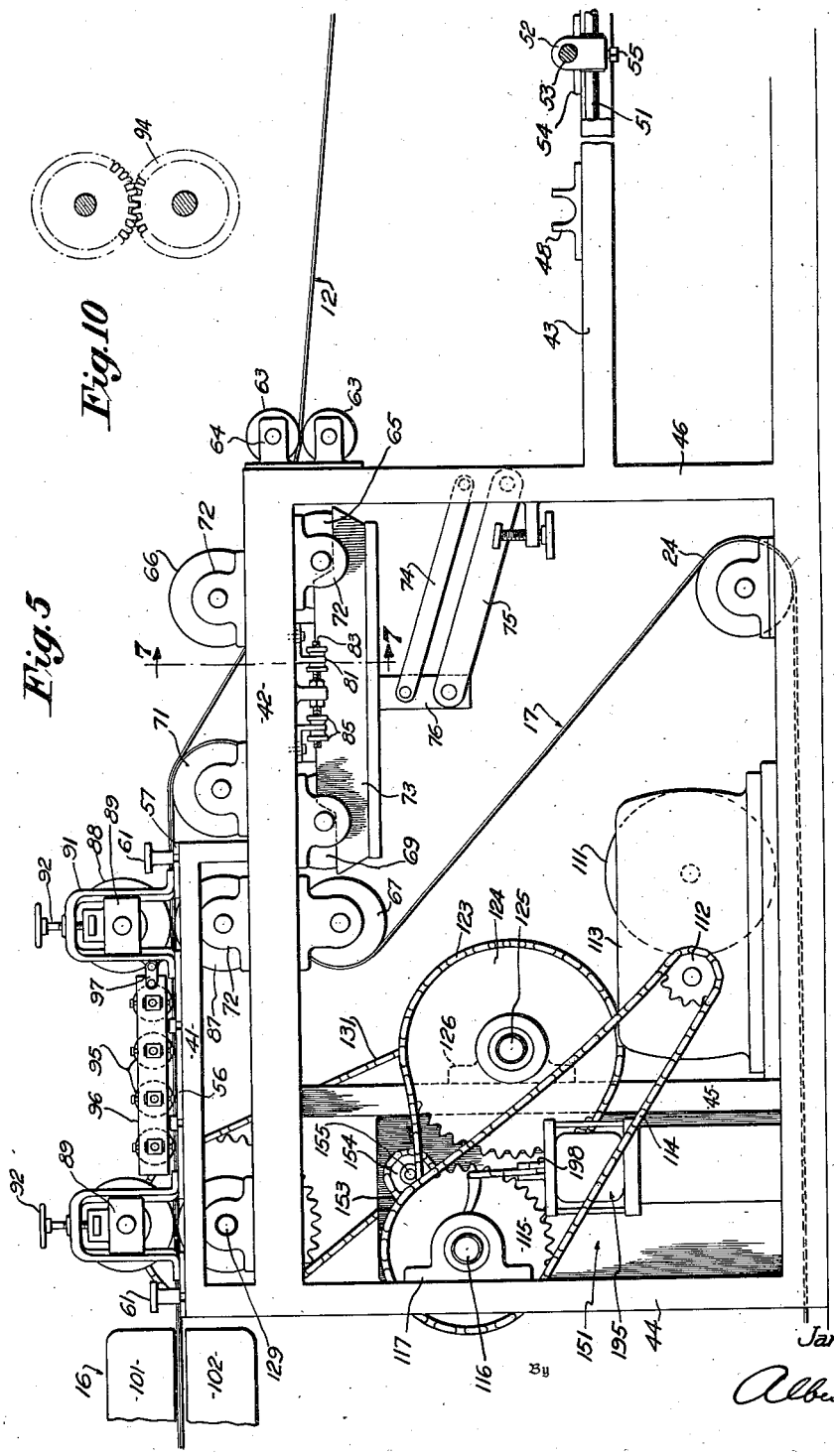
Inventor
James A. Webb
By Albert R. Henry
Attorney May 31, 1938. J. A. WEBB 2,119,476
MACHINE FOR MAKING MULTI-PLY BELTING
Filed June 12, 1936 5 Sheets-Sheet 5

Inventor
James A. Webb
By Albert R. Henry
Attorney

Patented May 31, 1938

2,119,476

UNITED STATES PATENT OFFICE 2,119,476

MACHINE FOR MAKING MULTI-PLY BELTING

James A. Webb, Buffalo, N. Y., assignor to J. A. Webb Belting Co., Inc., Buffalo, N. Y.

Application June 12, 1936, Serial No. 84,887

12 Claims. (Cl. 154—3)

This invention relates to the manufacture of belting, and it has particular reference to a machine for making multi-ply leather power transmission belts.

A multi-ply leather belt consists of two or more plies, each of which is formed from strips of tanned leather which are secured seriatim at their ends, and which plies are secured to each other along their contacting faces by cement. In the belting industry, the term "cement" is employed to designate generally suitable securing media, among which are "hot cement" consisting primarily of animal glue, and "waterproof cement", which is essentially a synthetic composition such as a nitro-cellulose adhesive. Generally speaking, the waterproof properties of the synthetic compositions make them preferable for belting purposes, but there have been a number of practical difficulties which heretofore have militated against their more extensive use. One is the high cost of the finished belting when such compositions are used in the manual assembly practices known for a number of years.

It has, therefore, been for some time a desideratum of the art to improve the art of belt making to an extent permitting the more extensive use of waterproof cement, while, at the same time, preserving to the finished belt those desirable properties of strength and life which characterize a well made hand-assembled belt. In the machine making of belts according to methods which have heretofore been proposed, certain defects not found in the old manual methods have arisen, due to placing the belting or the plies thereof under too great tension during the assembly operations, thereby leading to such troubles as ply separation, which, to a certain extent, have offset the economical advantages sought by the use of machines. It is known, for example, that leather will stretch to a certain extent if placed under tension, but due to the nature of the substance, it is extremely difficult, if not practically impossible, to maintain a uniform tension throughout a number of conjoined plies without inducing additional complications. This is due to the fact that the hides from which belting leather is made are naturally curved, instead of flat, and the application of excess tension therefore causes the ply to curl along its edges.

In seeking to improve on the practices of the prior art, and to devise economic ways to make belting without sacrifice of the desirable properties of the belt, I have discovered that a substantial portion of the excess stretchiness of the belt may be eliminated during manufacture, without adversely affecting its life, if, during the assembly operations, only one ply is subjected to a limited tension, while the other ply is maintained in its natural condition. To apply this discovery in a practical way, I therefore propose to stretch to a limited extent one of the belt plies in a continuous band, and, while it is so stretched, to cement to it another ply of leather which is under practically no tension. These two plies are brought together, after application of whatever type of cement is desired, and are fed into a press which applies suitable pressure to unite them firmly together.

I have also discovered that high grade multi-ply belting, either with or without the inclusion of the stated single ply tensioning, may be made economically and rapidly by a method which involves bringing the plies, immediately after the application of the cement, into mutual contact, and then forwarding them to the press for final contacting operation by means of a pushing, instead of a pulling action, whereby the stated undesirable tensioning of the belt, or curling of the edges and ply separation, may be obviated. In working according to this method, I furthermore contemplate the employment of an intermittent mode of action, in which the plies are cemented, contacted, and forwarded during one interval of time when pressure is relieved, and then these actions are interrupted during a following time interval while the pressure is applied.

The present invention also contemplates a novel machine for making belts, including a novel combination of parts permitting of rapid and economical operation while utilizing the processes outlined above. The various principles of the machine, and the various specific objects, details, and advantages thereof, will become apparent from the following portions of this description, and will be more fully pointed out in the appended claims.

In the drawings forming a part of the description,

Fig. 1 is a side elevation, with the parts illustrated more or less diagrammatically, of one embodiment of a belt making machine;

Fig. 2 is a view similar to Fig. 1 of a modified form or a second embodiment of the machine;

Fig. 3 is a fragmentary perspective view showing the mode of connecting the belt plies together when using the machine of Fig. 1;

Fig. 4 is a plan view of the cementing and feeding portions of the belt making machine;

Fig. 5 is a side elevation of the parts shown in Fig. 4, drawn on a slightly enlarged scale;

Fig. 6 is an enlarged section on the line 6—6 of Fig. 4, showing particularly the cementing unit of the machine;

Fig. 10 is a section on the line 10—10 of Fig. 8 showing a detail of the connection between pairs of rolls.

Figure 8:
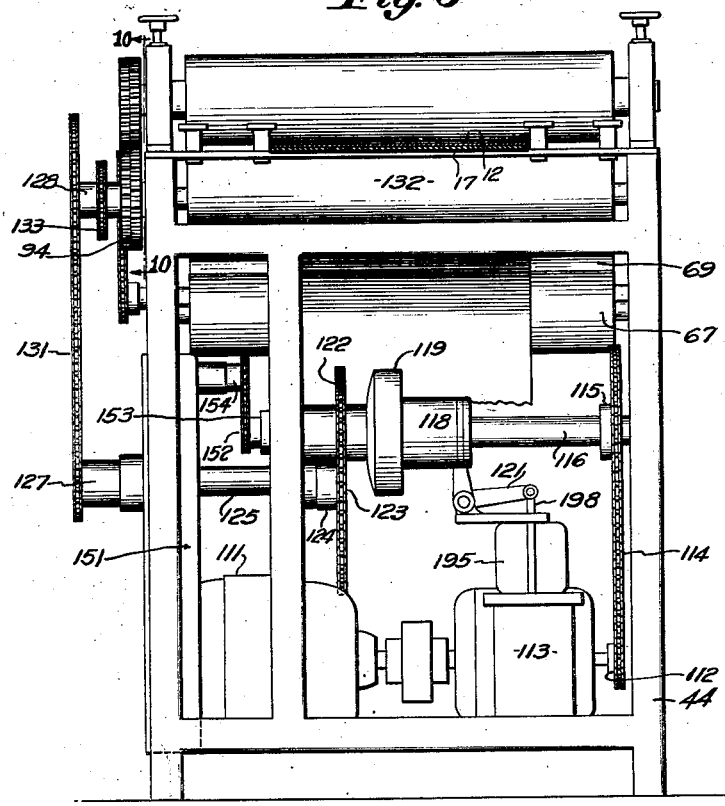
Fig. 8 is an end elevation at the drive end of the feed unit of the machine.

Referring first to Figs. 1, 2, and 3, there is illustrated more or less diagrammatically some of the features of the machine, as well as the novel method contemplated by this invention. At the right of Fig. 1 is shown a reel 11, on which is a roll or band 12 of a relatively long length of leather which is to constitute one ply of the finished belt. The free end of the ply 12 extends through a cementing unit, generally designated by the reference numeral 13, and which will be hereinafter more fully described. After emerging from the cementing bath, the ply 12 passes through one or more pairs of feed rolls 14, and then through an intermittently actuated platen type of press 16, in which it is firmly pressed against the other belt ply.

According to the plan shown in Fig. 1, the other ply 17 of the belt extends in a continuous length from the parts just described to a stretching pulley 18 of relatively large diameter, which preferably is located a substantial distance from the press 16. It may here be explained that these belt plies may be of considerable length, that is, from say two hundred to three hundred or more feet, and due to the extreme lengths, as well as the operations herein contemplated, it is therefore desirable to place the pulley 18 and its support on a track 20, so that it can be moved to and from the press to such extent as is required to draw the ply 17 taut.

The support for the pulley 18 consists of a pair of spaced brackets 19 each formed at its upper end with an adjustable bearing 21 adapted to receive the adjacent end of the trunnion 22 of the pulley 18. The lower ends of the supports 19 may be mounted in slideways or tracks 20 located on the floor, for adjustment with respect to the press 16. Each bearing 21 is provided with a screw 23, by means of which the ply 17 may be placed under such tension as is desired.

Starting at the left hand side of the press 16, the path of the ply 17 may be traced as follows: From the left hand side of the press 16 around the pulley 18, then along or under the floor line to pass under the pedestal of press 16, thence to a guide pulley 24 located below the cementing unit 13, thence up and into the cementing unit and out towards the left, at which point the ply 17 is brought into contact with the ply 12, then through the feed rolls 14 towards the press 16, and finally into the press where the plies are intimately secured to each other.

It is to be understood that, at the beginning of the belt making operations, the ply 12 is pulled from its reel 11 and is threaded through the cementing unit 13, while the ply 17 is threaded around the equipment in the path just described. In setting up the ply 17, it is convenient to join the ends by means of a hinge connection or belt clipper, such as is illustrated in Fig. 3. Each end of the ply 17 receives one portion 25 of the hinge which is connected to the other by a pintle 26. The ply is then placed under the desired tension by adjustment of the pulley 18, it being of course understood that during this operation, the press 16 and rolls 14 are open to permit the free passage of the ply.

In speaking of tension in the ply 17, it may be here pointed out that only a limited tension is intended. Experience has indicated that if the tension in the usual grades of leather used for belting exceeds a value of say one per cent or more elongation, the belt tends to run crooked on the pulleys, the plies separate at their edges, and the belt loses desirable elasticity and life. On the other hand, a limited amount of tension may be introduced into one ply only of the belt which will not lead to the stated defects, but, on the contrary, will increase the life and load transmitting value of the finished product. Such limited tension may, for general types of belting, be assumed to be one half of one per cent to one per cent elongation, the upper limit of course being safely under that value which distinguishes between helpful and harmful stretching. For much practical work, this limit can be determined by observing the curling tendency in the edges of the ply. In referring to limited tension or the pre-stretching of the ply 17, it will therefore be understood that such term is used to connote the features just stated.

After the ply 17 is set up with a suitable degree of pre-stretching, the free end of the ply 12 is connected thereto at the joint between the ends, by means of a belt clipper 27 formed with projecting hooks 28 which can engage the pintle 26. The conjoined plies are then run through the rolls 14, and the machine is set up ready for operation.

It is to be understood that, in operation, it is contemplated that the two plies 12 and 17, in passing through the cementing unit 13, will receive on contacting faces a coating of cement and will be brought into contact. Upon emerging from the bath the contacting plies are forwarded by the feed rolls 14 to the press 16 to receive enough pressure to force them to stick to each other permanently. These operations of coating, forwarding, and pressing are intermittent. That is to say, by suitable means hereinafter described, the press 16, which is provided with vertically movable platens, alternately squeezes the plies together, and recedes therefrom. When the pressure is applied, the feeding operation is interrupted until the platens recede, and, as soon as they are sufficiently spaced, the feed rolls 14 and the cementing unit is driven, to coat and advance a new stretch or length of belt into the press. The platens then move down and the feeding operation stops, and this intermittent action is continued until the ply 17 has traveled completely around its path, and the joined ends are again in or adjacent the position from which they started.

In moving through this repeated sequence of operations, the ply 12 is, of course, secured to the ply 17, which, during the same time, is unwound from its reel 11. As the plies are thus assembled and secured to each other, the ply 17 alone is maintained under a suitable limited tension, while the ply 12 is under substantially no tension save that negligible amount incident to its being pulled along with the tensed ply 17. When the ply 17 has moved around through its circuit once, therefore, it is in effect replaced by a multi-ply belt, in which one ply is pre-stretched, while the other is in its natural or untensed condition. The resulting product, a multi-ply leather belt having secured plies existing under differential tension, is, insofar as I am aware, a novel article of manufacture, and tests may be readily made thereon to show that it is superior in power-transmitting properties and life than prior art belts known to me, in which none of the plies was under initial tension, or all of the plies were uniformly stretched to an undesirable extent.

The apparatus shown in Fig. 2 is, to a large extent, a duplicate of that shown in Fig. 1, but differs primarily in that the second embodiment is preferred when it is desired to make belts which do not include the foregoing differential ply tension. Thus, the second embodiment includes the reel 11 for the ply 12, cementing unit 13, feed rolls 14, and press 16, all of which operate as hereinabove described. A second reel 29, however, is mounted adjacent the reel 11, to receive a band 31 of leather constituting the other ply of the belt. This band extends around the guide pulley 24, but in the opposite direction, and thence into and through the cementing unit 13, where it is coated and contacted with the ply 12. The conjoined plies then proceed through the feed rolls 14 and the press 16 in the form of the belt 32, which is wound up as desired on the receiving reel 33, located in brackets 30 a suitable distance from the press.

It is not intended that the reels 11 and 29 should be supplied with brakes or drags to impart a substantial tension to the plies, either in equal or different amounts, for, while this could be done, the preservation of that tension beyond the feed rolls 14 would require placing the receiving reel 33 under positive force. It has been discovered that, if the newly finished belt is wound under such tension, there is a strong chance of damage to the product, due to the accumulating pressure or pull in the successive wraps of belting around the receiving reel. Hence, in making a belt in which one of the plies is pre-stretched, I advise the plan set forth in Fig. 1, and, in using the plan of Fig. 2, I prefer to push the belting into the press 16 by means of the feed rolls 14, rather than pull it through by applying a positive force on the reel 33. In this manner of operation, it will be observed that the assembled plies are not tensed during the pressing operation, nor are they significantly tensed by winding on the reel 33. It will, of course, be apparent that this mode of operation is entirely permissible, by virtue of the employement of the intermittently operated platen type of press.

Having thus outlined the general features of my improved method and machine, and the nature of the belting produced thereby, I will now describe the several parts of the machine in greater detail.

The machine as shown in Figs. 5 and 8, and also in Fig. 4, comprises a frame including pairs of horizontal rails 41, 42, and 43, supported on vertical standards 44, 45, 46, and 47. As shown in Fig. 4, the rails 43 receive open bearing blocks 48, which are adapted to receive the spindle 49 of the spool 11 for the ply 12, and the spool 29 for the ply 31 when the machine is operated according to the plan of Fig. 2. The machine is adapted to receive one or more reels or spools of belting on each of its spindles 49, and plies of various widths, and in order to retain the plies in proper aligned relation while progressing through the machine, provision is made for adjustable guide members.

As best shown in Figs. 4 and 5, these guides comprise tubes 51 secured to blocks 52 which in turn are adjustably mounted on transverse rods 53 secured in brackets 54 disposed on the rails 43. Each block 52 contains a set screw 55 for retaining the guides in their desired position. In Fig. 4, only one set of guides is shown in use, the remainder simply being displaced for use as desired.

The cementing unit 13 is disposed adjacent the rails 42 to receive the plies from the spools, and to apply a coating of cement to one face thereof. During and after movement of the plies through the cementing unit, the plies are maintained in proper lateral position with respect to the machine, by means of suitably located additional guides. These guides are mounted on plates 56 and 57, extending transversely between the rails 41, and also plates 58 mounted between the standards 46. The plates are spaced, as shown in Fig. 6, for example, to receive spacer bolts 59 which are threaded to receive adjusting nuts 61. These members may be transversely positioned in the spaces between the plates to contact the sides of the plies and thereby prevent their lateral displacement.

The cementing unit 13 includes a pair of pilot rolls 63 mounted between bearing blocks 64 disposed on the standards 46, which direct the ply 12 from its spool 11, past the adjacent guide nuts 61, between a pair of rolls including the applicator roll 65 and the positioning roll 66. The ply 31 (or 17, as the case may be) passes about the guide roll 24 (see Fig. 5) and then about a pilot roll 67 which is mounted as shown in Fig. 6 in bearings 68 to the lower side of the rail 42. This ply then passes over an applicator roll 69 similar to the roll 65 and around a positioning roll 71 similar to the roll 66.

Figure 7:
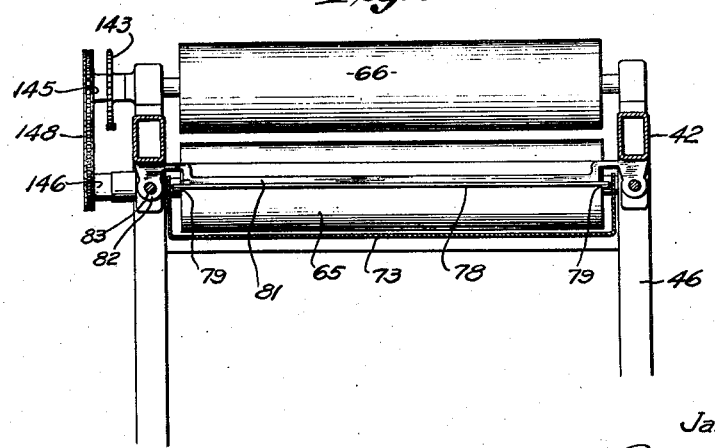
Fig. 7 is a section on the line 7—7 of Fig. 5.

The applicator rolls 65 and 69, and the positioning rolls 66 and 71, are all mounted through their trunnions transversely of the rails 42 in similar bearings 72 which are respectively located on the lower and upper sides of such rails. Disposed below the horizontally aligned applicator rolls 65 and 69 is a pan or tank 73 (Figs. 5, 6, and 7) which is adapted to receive a suitable quantity of liquid cement in which, during operation, the applicator rolls are partially immersed. Any suitable means may be provided to maintain a substantially constant level of liquid in the tank during operation, such, for example, as the parallel adjustable supports 74 and 75, which are secured at one common extremity to depending brackets 76 secured to the tank 73, and which are pivoted to the standards 46 at the opposite ends.

Means are provided to adjust the thickness of the film of cement built up on the applicator rolls during their rotation in the liquid bath, comprising doctor blades 78 which extend across the faces of the rolls, and doctor blades 79 which extend along the sides of the rolls, and are also secured to the blades 78. Each blade 78 is secured to an adjustable frame 81 provided with bearing portions 82 (Fig. 7) which receive threaded studs 83 secured to blocks 84 located on the rail 42. Adjusting nuts 85 are disposed on opposite sides of the bearing portions 82, and they are accessible for manual operation to space the frames 81 and accompanying blades 78 with respect to the rolls to such extent as is desired. The side blades 79, which are secured to the blades 78, contact the sides of the applicator rolls closely at all times, thereby preventing the film of cement from creeping up and over the sides of the belt plies.

As will be hereinafter more fully explained, means are provided to drive the applicator rolls 65 and 69 in a direction which, at the point of contact, is opposite to the direction of movement of the plies. It will thus be understood that as the plies move over the applicator rolls, these rolls revolve against the plies, and thereby apply and thoroughly brush in and coat one surface of each ply with a layer of cement of the desired thickness.

The positioning rolls 66 and 71 are so positioned above the applicator rolls, and with respect to each other, as to bring the two plies together, with their coated surfaces in mutual contact, on the upper part of roll 71. It is advantageous to bring the plies together in this fashion, as soon as possible after the application of the cement, since, particularly with a quick drying cement of the waterproof type, a more adhesive union will be obtained.

After leaving the cementing unit 13, the united or contacted plies are directed past the adjacent guides 61 between idler rolls 87 and 88. The lower roll 87 is mounted between bearings, such as the bearings 72, secured to the rails 42, and the upper roll 88 is mounted between bearing blocks 89 which are vertically disposed in standards 91 secured to the rails 41. The blocks 89 are vertically adjustable by means of screws 92 to permit of displacement of the roll 88 from the conjoined plies during setting-up operations or adjustment for contact with belts of different thicknesses. The rolls 87 and 88 are interconnected by gears 93 (see Fig. 4) so that they always operate in unison and at the same speed.

It will be observed that the plates 56 and 57 form a flat table between the rails 41 which may receive the contacting plies during movement from the rolls 87 and 88, to the feed rolls 14 shown in Figs. 1 and 2. As the feed rolls 14 are similar in construction to the rolls 87 and 88, and are similarly mounted on the frame, further description of these details need not be made. It may be noted, however, that these rolls are likewise geared together, as indicated by the reference number 94, and further are positively driven from a source of power, as hereinafter more fully described. The purpose of providing a driving connection for the feed rolls 14 is to pull the belting plies through the coating bath under such tension or absence of tension as might be desired, according to the principles hereinabove set forth, and to forward the contacting plies to the press 16, which is located just beyond the feed rolls.

With certain types of belting it is advantageous to dispose between the idler rolls 87 and 88 and the drive rolls 14 a plurality of light pressure rolls 95 which are mounted in suitable adjustable bearings located in a rectilinear frame 96 positioned above the plates 56. The frame 95 is connected through links 97 to the standards 91, whereby the frame and accompanying rolls may be moved to an inoperative position if their employment is not desired. The light pressure applied by the idler rolls 95 is frequently advantageous to prevent the plies from separating as they pass between the rolls 87, 88, and 14.

The press 16 is of the well known type having a bed plate 101 (Figs. 1 and 9) and a platen 102 which is operated by a hydraulic ram 103. Such presses are controlled by a valve 104, the stem 105 of which is movable from an operative, or pressure applying position, to an inoperative, or pressure releasing position. When the stem 105 is in the operative position, fluid pressure closes the press, an automatic cut-off (not shown) being customarily provided to limit the amount of pressure developed. When the stem 105 is in the inoperative position, the fluid pressure is reversed, thereby permitting the platen 102 to recede from the plate 101 to such distance as may be required. As hereinafter described, the stem 105 is automatically operated through suitable controls to provide intermittent operation.

Figure 9:
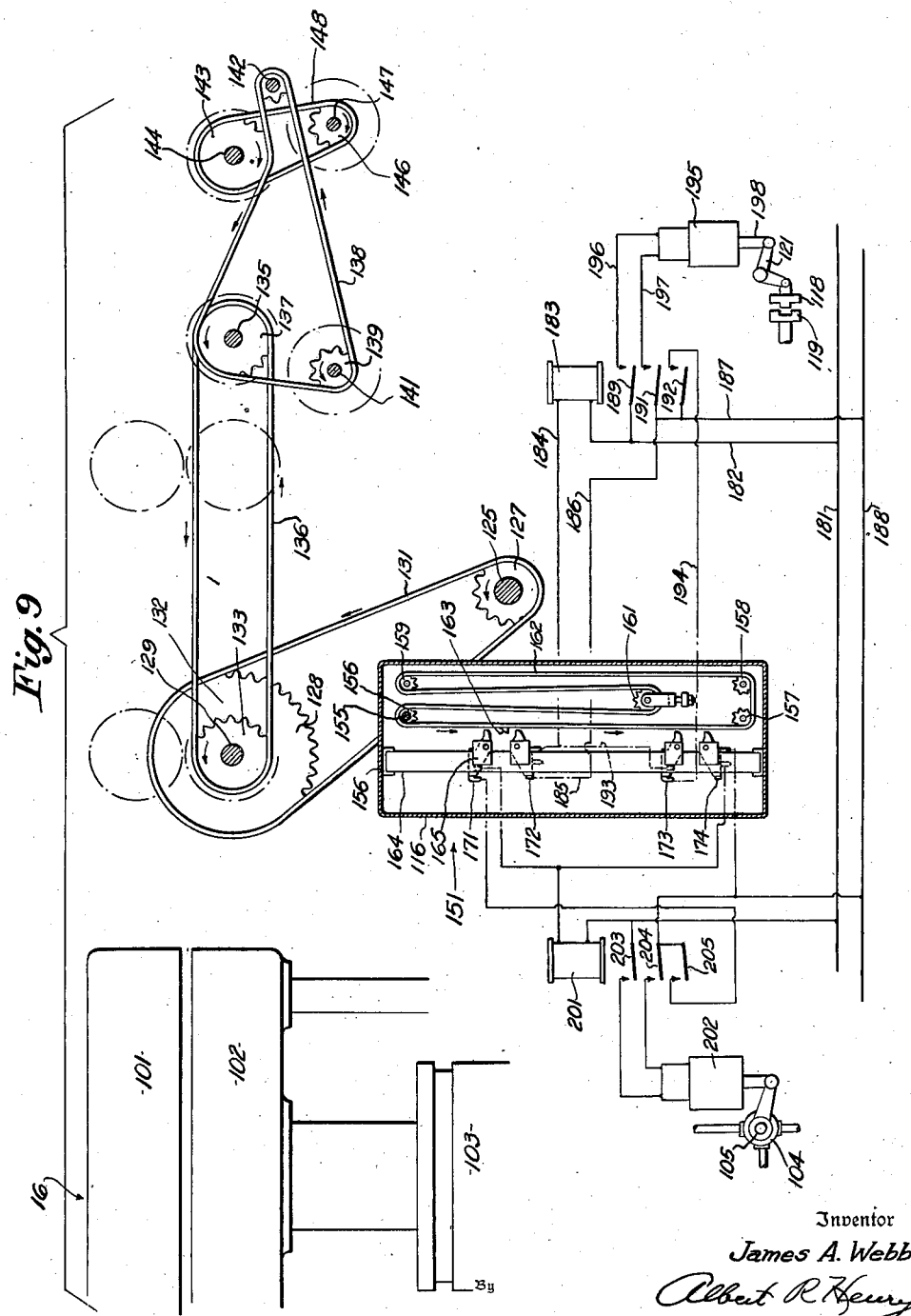
Fig. 9 is a section on the line 9—9 of Fig. 8, showing particularly the driving connection between the various rolls and also the control for the driving mechanism.

Referring now to Figs. 5, 8, and 9, the drive for the power operated rolls, which is operated in intermittent timed relation with the operation of the press 16, is taken from a motor 111 which drives a sprocket 112 through a variable speed reducing unit 113. Power is transmitted from sprocket 112 through a chain 114 to a driven sprocket 115, which is keyed to a countershaft 116 mounted in bearings 117 secured to the standards 44. A clutch member 118 is keyed to the shaft 116 and is slidable therealong for engagement with a cooperating clutch member 119 which is rotatably mounted on the shaft. The member 118 may be operated through a bell crank 121 to effect the engagement or disengagement of the clutch. The idler clutch element 119 carries a sprocket 122 which, through a chain 123, operates a sprocket 124 secured to a shaft 125, mounted in bearings 126 disposed on the standards 45.

The shaft 125 directly drives the lower roll of the two feed rolls 14 through sprockets 127 and 128 respectively secured to the shaft 125 and to the trunnion 129 (Fig. 9) of the lower feed roll, and a connecting chain 131. For purposes of clarity in further description, this lower feed roll, when specifically referred to, will be designated by the reference number 132. Also mounted on the trunnion 129 is a sprocket 133 which is connected to a similar sprocket 134 secured to the trunnion 135 of the positioning roll 71 by a chain 136. The trunnion 135 also carries a second sprocket 137 over which passes a chain 138 that also extends about a sprocket 139 mounted on the trunnion 141 of the applicator roll 69, a positioning sprocket 142, and in contact with a sprocket 143 secured to the trunnion 144 of the positioning roll 66. The applicator roll 65 is driven from the roll 66 by means of sprockets 145 and 146, respectively secured to trunnion 144 and the trunnion 147 of the roll 65, and connected by a chain 148. It will thus be seen that, as power is applied through the clutch connection, the feed rolls 14 are positively driven, and also the applicator and positioning rolls of the cementing unit.

The direction of rotation of all of these rolls is indicated in the drawings by the arrows, and it will be observed that the driving connections are such as to rotate the applicator rolls 65 and 69 against the direction of movement of the plies at the points of contact, while the positively driven positioning rolls 66 and 71 are driven in the direction of movement of the plies, whereby whatever drag may be imposed by the reverse movement of the applicator rolls is offset by the assistance given by the positioning rolls. By this means, there is no danger of increasing or materially modifying the tension condition desired in the plies during their movement through the cementing unit. It will also be observed that the feed rolls are both positively driven in the desired direction of movement toward the press 16, so that the tension condition of the plies is not changed during such movement, and the feed rolls in fact push the contacted plies into the press, thus avoiding any necessity of drawing the belting under the platens while in a state of increased tension.

While it will be obvious that the operation of the press control valve 104 and the clutch operating bell crank 121 may be manually effected, it is intended to operate these members in automatic fashion, and in sequential order. For this purpose, a control unit, generally designated by the reference numeral 151, is provided for operation from the countershaft 116, which, as above described, is continuously operable through the motor 111. A sprocket 152 is secured to the end of the countershaft 116, and, through a chain 153, operates a control drive sprocket 154. This last named sprocket is secured to a shaft 155 extending into the unit 151 where it receives a sprocket 156. Other sprockets, 157, 158, 159, and 161, are mounted within the unit 151, and over all of them extends a chain 162 of substantial length. A control finger 163, which projects slightly from the chain, is secured thereto for operation of a number of electrical controls.

A bar 164 is mounted in the unit 151 in parallel relation and adjacent to the length of chain extending between the sprockets 156 and 157. This bar receives a number of lineally adjustable clamps 165, on each of which is pivoted and secured a control switch. It will be understood that the control chain 162 may thus be continuously driven, and the finger 163 will, during its movement, successively contact the various switches.

Fig. 9 also shows in symbolic manner the control circuits for the operation of the feed rolls and press. The four switches, 171, 172, 173, and 174 mounted on the bar 164 are advantageously of the mercury-in-bulb type, through which an electric circuit may be made when the bulb is in a horizontal position, but broken when the bulb is tilted to permit the mercury to run to one end, and away from one of the switch points which extends through the bulb. These switches may be biased by springs or counterpoises to either the horizontal or closed position, or a tilted or open position, and, in the present case, switches 171 and 173 are normally closed, while switches 172 and 174 are normally open, and they assume respectively open and closed positions only when, and so long as, they are moved from their biased positions by contact with the control finger 163. As this type of switch is a well-known article of commerce, it is deemed unnecessary to illustrate or describe its structure and mode of operation in further detail.

Switches 171 and 174 are employed in the circuits which control the operation of the press 16, while switches 172 and 173 are connected in the control circuits for operating the clutch actuating crank 121.

The circuits through the switches 172 and 173 for the control of the clutch actuator 121 may be described in conjunction with their associated parts as follows: From one side 181 of a main electric line current flows via a branch wire 182 to one end of the coil of a relay 183, and passes through the coil to one contact of normally open switch 172 through wire 184. A wire 185, connected to the opposite contact of switch 172, connects to a wire 186, which in turn leads through wire 187 to the other side 188 of the main line.

This circuit, which may be called the pick-up circuit, transmits current through the coil of relay 183, thus energizing it and permitting it to pick up its three armatures 189, 191, and 192. As soon as the finger 163 passes switch 172, however, the switch opens, and it will therefore be apparent that the circuit just traced will also be opened, permitting the relay to be deenergized and the aramtures to drop.

To avoid this deenergization, a stick circuit is therefore provided to maintain relay 183 energized. This circuit may be traced as follows: From main line 181, current flows via wire 182, coil 183, and wire 184 as before, to a wire 193 connected between wire 184 and one side of switch 173, through normally closed switch 173 to wire 194 which is connected to the contact point of armature 192. The opposite side of armature 192 is in turn connected to wire 187, which leads to main line wire 188. Since armature 192 is picked up by relay 183 upon the closing of switch 172, and since this energization is maintained through the circuit containing normally closed switch 173 even though switch 172 may be open, it follows that the relay will not be deenergized until switch 173 is opened.

After the finger 163 passes switch 172, to close the same momentarily to energize the pick-up and stick circuits just described, it moves to switch 173, and, in passing this switch, causes it to open. The stick circuit is thereby broken, and since there is no longer any energizing circuit for the relay 183, the three armatures drop, and the stick circuit remains broken at armature 192, even after switch 173 is restored to its normally closed position.

During the time that finger 163 moves between switches 172 and 173, the clutch thrustor or operating solenoid 195 is energized by current flowing through the following circuit: From wires 181 and 182 to armature 189, through the contact point of the armature via wire 196 to one end of the coil of thrustor 195, through the coil to wire 197 which is connected to contact point of armature 191, and through wire 187, which is connected to this armature, to main line wire 188. Energization of the coil of the thrustor moves its movable element 198, which is mechanically connected to the bell crank 121 in such fashion as to cause the engagement of the clutch members 118 and 119, thereby driving the feed rolls 14 and the rolls of the cementing unit 13 to forward and coat a length of belting. During the time required for the finger 163 to move with the chain 162 from switch 173 to 172, the above described circuits are all open, the bell crank 121 is retracted to disconnect the clutch members 118 and 119, and hence there is no movement of the feeding and cementing rolls during this period.

The length and speed of the chain 162, and the relative positions of the switches, are so adjusted as to open the press 16 while the clutch is engaged, and to close the press while the clutch is disengaged. The press control is quite similar to the clutch control, as far as the circuits are concerned, and it is therefore deemed unnecessary to repeat in detail all of the elements of the circuits. Switch 171 is a normally closed switch, to release the press valve 104, while switch 174 is a normally open switch to close the press valve. Accordingly, the stick circuit for relay 201 is taken through switch 171, while the pick-up circuit for the same relay is taken through switch 174. The circuit for the electro-pneumatic valve 202 is established through the armatures 203 and 204, which are respectively connected to each of the main line wires 181 and 188.

The sequence of operations may be traced by considering the movement of the chain 162 and attached finger 163. In the position shown in Fig. 9, finger 163 is between switches 171 and 172, and hence switches 171 and 173 are closed, while switches 172 and 174 are open. Since switch 171 has just been momentarily opened, the stick circuit for relay 201 has just been opened, and armatures 203, 204, and 205 are down, thus opening the circuit for the electro-pneumatic valve 202, and also the stick circuit itself. With valve 202 deenergized, thus bleeding valve 104, hydraulic pressure is released from press 16, and the press therefore begins to open.

The clutch 118—119 is also disengaged, since its holding circuit was broken through switch 173 during the prior operation thereof by the finger 163. Hence, in the interval of time required for finger 163 to move from switch 171 to switch 172, the rolls 14 are not driven, and the press 16 is beginning to release. It is to be assumed that as the finger contacts switch 172, press 16 has opened sufficiently to permit the movement of the belting between the platens 101 and 102 thereof.

As the finger strikes switch 172, the pick-up circuit for relay 183 is established, the relay is energized, thereby establishing its own stick circuit through switch 173 to maintain the circuit through thrustor 195, thus causing the engagement of the clutch. The rolls 14 and cementing unit 13 are now driven, thereby coating, contacting, and forwarding a new section of belt to the press 16, and moving the section which was in the press out of the zone of action. Switch 173 is so located with respect to the position of switch 172, and the speed of the chain 162, that the desired length of belting is forwarded by the rolls 14 by the time the finger 163 strikes switch 173.

Upon the operation of normally closed switch 173, the stick circuit for relay 183 is broken, thrustor valve 195 is deenergized with the dropping of armatures 189 and 191, and the clutch is thereupon disengaged, thus stopping further movement of the cementer and rolls 14. No further engagement of the clutch is effected until the finger 163 again reaches switch 172. Immediately after opening switch 173, however, the finger 163 contacts normally open switch 174 to close the same, thus establishing the pick-up circuit for relay 201, and thereby its stick circuit taken through switch 171. Electro-pneumatic valve 202 is thus energized, to apply pressure to the platens of press 16, which thereupon close and continue to apply pressure to the newly inserted length of belting until the finger 163 strikes closed switch 171, thereby releasing the pressure and terminating the complete cycle of operation.

It will thus be seen that means are provided to carry out the method of making the belt which involves the steps of bringing the plies together with cement on their contacting faces and forwarding the freshly cemented section to the press, while the press is open, and withholding further material from the press while the press is closed. These sequential operations are synchronized with each other so that the belting may move through the cementing unit as rapidly as the press can receive it. On the other hand, the cement is not applied to the plies while the press is closed, and hence the difficulties which would be encountered if the plies were contacted and then made to wait for pressure are obviated.

From the foregoing description, it will be understood by those skilled in the art that I have provided an improved method and machine for making belting, and have also produced a new and useful multi-ply leather belt. It will be observed that the machine herein described is so made as to admit of the ready practice of either the limited tensioning method described in connection with Fig. 1, or the untensioned method described in connection with Fig. 3. By eliminating the necessity for tensioning the plies unduly during the assembly operations, it is possible to preserve to the belting all of the desirable properties which heretofore have only been obtainable by laborious and expensive hand methods. It will be noted that, in providing for the limited tensioning of one ply only, these features are also preserved to such extent as is desired.

By using the herein described intermittent and synchronized method of operation, it is not only possible to make belting rapidly and without introducing undue tension, but it is also possible to feed freshly cemented lengths of belting to the press with the elimination of time delays during which the cement could partially dry, or the plies curl, separate, or become displaced. These advantages will be especially appreciated by those familiar with the use of waterproof cement, which, by virtue of its nature, has been found rather difficult to handle.

It is not intended that the invention be regarded as limited to the precise details herein set forth by way of illustration of its principles, but that the invention should be regarded as commensurate with the scope of the following claims.

I claim:

1. A belt making machine comprising supporting means for each of two separate belt plies, a cementing unit adapted to apply cement to one face only of each ply, means for bringing the cemented faces into mutual contact, roller means for pulling the plies through the cementing unit and forwarding the contacting plies to a point beyond said roller means, a platen press disposed beyond said roller means to receive said contacting plies, and means for intermittently applying pressure through said press and operating said roller means as sequential operations.

2. A belt making machine comprising a cementing unit, means in said cementing unit for applying cement to one surface of each of a pair of separate belt plies, power driven roller means adjacent said cementing unit to move said plies through said unit and to forward said plies after contact to a point therebeyond, pressure applying means adapted to apply pressure to said contacting plies after passage through said roller means, intermittent drive means for moving said plies through said cementing means and said roller means, means for intermittently actuating and releasing said pressure applying means, and control means associated with said intermittent means for operating said drive means when said pressure applying means is released and for disconnecting said drive means when said pressure applying means is actuated.

3. A belt making machine comprising a cementing unit including two pairs of rolls, a pair of feed rolls disposed on the emergent side of said unit, means for positively driving said feed rolls to move belt plies through said unit, means for positively driving said two pairs of rolls, said last named means being so disposed as to drive the rolls of each of said pairs in the same rotational direction, and means disposed adjacent the feed rolls to apply pressure to plies passing through said pairs of rolls in said cementing unit.

4. In a belt making machine, the combination with means for applying pressure to contacting and cemented belt plies of means for applying cement to the faces of each of a pair of plies, said cement applying means comprising two pairs of power driven rolls, a cement tank disposed below said rolls, one of each pair of said rolls being so spaced with respect to said tank as to receive thereon a coating of cement adapted to be placed in said tank, the other roll of each pair being disposed above said tank, means for inserting a belt ply between the rolls of each pair for movement therebetween, and means for driving said lower rolls of each pair in the same rotational direction as the upper rolls of the pair, the said upper rolls being driven in the same direction as the direction of movement of the plies, whereby said upper rolls will forward the plies through the tank and the lower rolls will apply cement to the faces thereof against the normal directional movement of the plies.

5. In a belt making machine, a press adapted to receive contacting and cemented plies of belting, means for feeding said plies to said press, and means for applying cement to the faces of said plies prior to transmittal to said press, said last named means including a tank adapted to receive cement, two pairs of spaced rolls disposed above said tank, the lower roll of each pair being adapted to dip into cement contained in said tank, means for driving the upper rolls of each pair in such direction as to move the plies disposed between said rolls toward said press, and means for driving the lower rolls of each pair in the same rotational direction as the upper rolls, whereby said lower rolls may force cement into said plies against the movement of the plies through said pairs of rolls.

6. In a belt making machine, in combination, means for applying pressure to a pair of contacting belt plies, means for moving said plies towards said pressure means, means for bringing said plies into surface contact as said plies are so moved, and means for applying cement to one surface of each of said plies just prior to contacting the same, said cement applying means comprising power driven rolls adapted to contact the surfaces of said plies and to move in a counter direction with respect to said plies at said point of contact, and means for applying cement to said power driven rolls at a point spaced from said point of contact.

7. A belt making machine comprising means for bringing together into surface contact a pair of belt plies, means for cementing the contacting surfaces of said plies prior to mutual contact, a press, means for transmitting said contacting plies to said press, means for driving said transmitting means, means for opening and closing said press, and means for operating the opening means for said press, the driving means, for disconnecting the driving means and for operating the closing means for said press as sequential operations.

8. A belt making machine comprising a cementing unit adapted to apply cement between a pair of belt plies, means for feeding contacting plies to a press, a press adapted to receive said contacting plies for application of pressure thereto, a power drive for said feeding means, a clutch disposed in said drive, a continuously operated control drive, a control finger on said control drive, and a plurality of controls disposed adjacent said control drive and adapted to be successively operated by said finger, said controls respectively effecting the engagement and disengagement of said clutch and the closing and opening of said press.

9. A belt making machine comprising a cementing unit including a tank adapted to receive cement, applicator rolls disposed above said tank for partial submersion in the contents thereof, positioning rolls disposed above said applicator rolls, means for positively driving all of said rolls to apply cement to the surface of each of a pair of belt plies passing between said applicator rolls and adjacent positioning rolls and to move said plies through said unit, doctor blades mounted adjacent said applicator rolls to control the quantity of cement applied by said applicator rolls, pilot rolls mounted adjacent the applicator rolls to direct said plies between said rolls, means disposed adjacent said unit and on the emergent side thereof to contact the cemented surfaces of the plies, feed rolls disposed adjacent said unit to effect the movement of the plies therethrough, and press means disposed adjacent the feed rolls to apply pressure to the contacting plies passing through the feed rolls.

10. In a belt making machine, a cementing unit adapted to apply cement between a pair of belt plies, said unit including an applicator roll and a positioning roll disposed adjacent said applicator roll, means for driving said rolls, a pair of feed rolls adapted to move said belt plies through said unit, said feed rolls being interconnected for concurrent driving, a press adapted to compact said plies together, driving means for said rolls including a pair of clutch members, operating means for said press, and driving means adapted to effect the engagement and disengagement of said clutch members and the operation of said press.

11. In a belt making machine, a pair of feed rolls, a driving connection between said rolls whereby they may be driven in unison, a source of power, a second driving connection between said source of power and said driving connection for said rolls, said second driving connection including a clutch, means for effecting the engagement or disengagement of the clutch, a power operated press, a timing drive, means connecting said timing drive to said source of power for continuous operation, a control finger on said timing drive, a plurality of electric switches disposed adjacent said timing drive for momentary operation by said finger, an electro-magnetic control for said clutch actuating means, an electro-magnetic control for said press, and electric circuits extending through said switches adapted upon the momentary operation thereof to energize and deenergize said electro-magnetic controls in such sequence as to effect the engagement and disengagement of the clutch and the closing and opening of said press.

12. A machine for making a multi-ply belt comprising means for supporting a pair of belt plies in spaced relation, means for moving said plies in unison to a common point of contact, means adjacent said common point for applying cement to a surface of each of said spaced plies, a press, means for intermittently operating said press, means for moving contacted belt plies from said point of contact to said press, and means for operating said last named moving means intermittently and in timed relation with said press operating means.

JAMES A. WEBB.